United States Patent [19]

Fischer et al.

[11] Patent Number: 5,388,859
[45] Date of Patent: Feb. 14, 1995

[54] ISOLATION MEMBER FOR AIR BAG INFLATOR

[75] Inventors: Craig M. Fischer; John P. O'Loughlin, both of Mesa, Ariz.

[73] Assignee: TRW Inc., Lyndhurst, Ohio

[21] Appl. No.: 150,367

[22] Filed: Nov. 9, 1993

[51] Int. Cl.6 ............................................. B60R 21/26
[52] U.S. Cl. .................................... 280/737; 280/740
[58] Field of Search ........................ 280/736, 737, 740

[56] References Cited

U.S. PATENT DOCUMENTS

| Re. 28,164 | 9/1974 | Stephenson | 280/737 |
|---|---|---|---|
| 3,721,456 | 4/1971 | McDonald | 280/736 |
| 3,777,772 | 12/1973 | Arnold et al. | 280/737 |
| 3,834,729 | 9/1974 | Oka et al. | 280/737 |
| 3,862,767 | 1/1975 | Chute | 280/737 |
| 3,891,233 | 6/1975 | Damon | 280/737 |
| 5,031,932 | 7/1991 | Frantom et al. | 280/737 |
| 5,199,740 | 4/1993 | Frantom et al. | 280/736 |

*Primary Examiner*—Kenneth R. Rice
*Attorney, Agent, or Firm*—Tarolli, Sundheim & Covell

[57] ABSTRACT

An air bag inflator (10) is actuatable to supply inflation fluid under pressure, through discharge openings (40), into a diffuser chamber (90) and thence through gas outlets (92) into an air bag. An isolation membrane (100) extends across the diffuser chamber (90) between the discharge openings (40) and the gas outlets (92). The isolation membrane (100) is welded to the housing at axially and radially spaced locations (106, 128). When the inflator (10) is not actuated, the isolation membrane (100) blocks fluid flow including the conduction of moisture from the environment around the inflator through the discharge openings (40) and into the interior of the inflator. The isolation membrane (100) has a weakened portion defined by a stress riser (130). When the inflator (10) is actuated, the pressure of the fluid flowing through the discharge openings (40) breaks the isolation membrane (100) at the stress riser (130). The isolation membrane (100) moves to a second location in the diffuser chamber (90) clear of the gas outlets (92) to enable fluid flow out of the diffuser chamber and into the air bag.

17 Claims, 4 Drawing Sheets

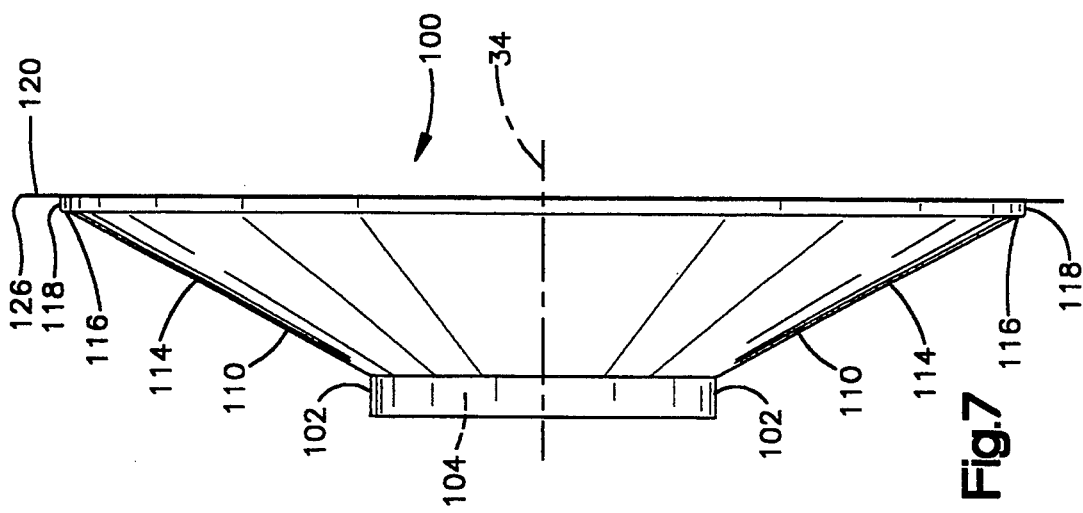
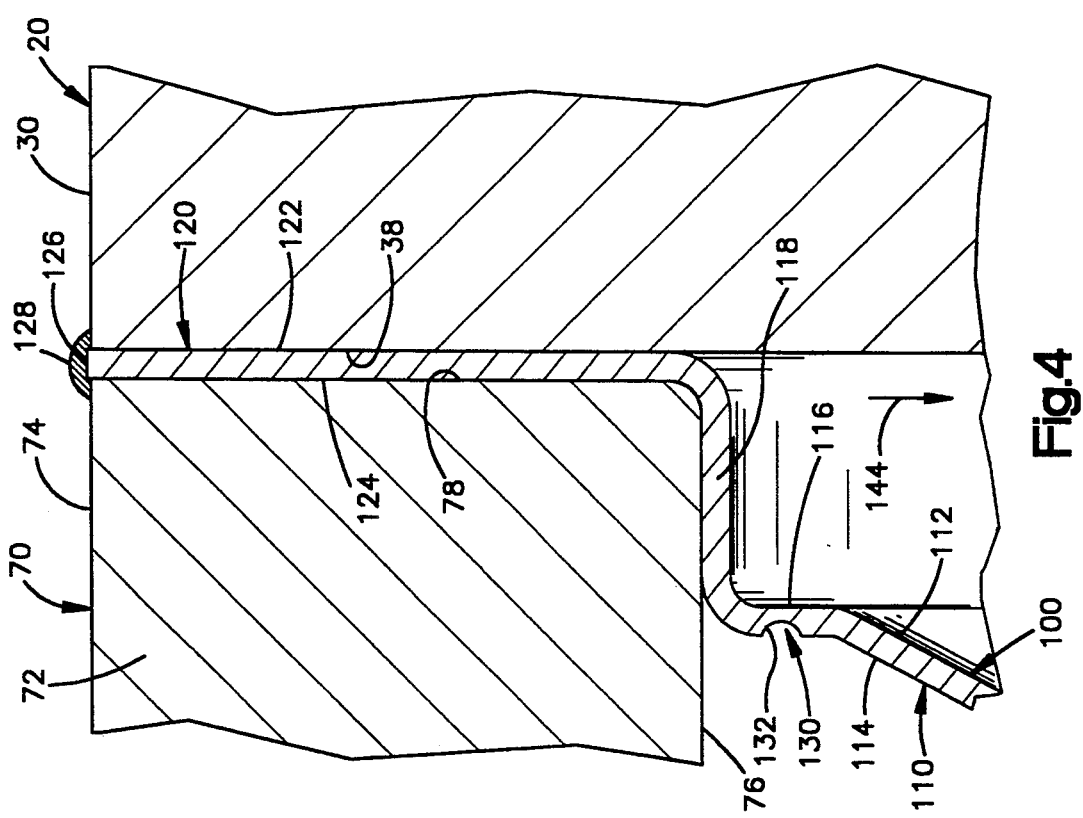

ISOLATION MEMBER FOR AIR BAG INFLATOR

TECHNICAL FIELD

The present invention relates to an inflator assembly for inflating an inflatable vehicle occupant restraint, such as an air bag. More particularly, the present invention relates to an air bag inflator having an isolation member for blocking conduction of moisture from the environment around the inflator to gas generating material inside the inflator.

BACKGROUND OF THE INVENTION

There are many known air bag inflator constructions. Some inflator constructions include combustible gas generating material. A known inflator construction includes a combination of stored gas and combustible gas generating material. Upon ignition of the gas generating material, the stored gas is heated, and there is a resulting increase in fluid pressure. The increased fluid pressure ruptures a member to release the stored gas and the gas created by ignition of the gas generating material from the inflator for flow into an air bag. The gas flows through discharge openings in a housing of the inflator into the air bag.

The combustible gas generating material may be subject to degradation if exposed to moisture in the ambient atmosphere around the inflator. Accordingly, inflators include some means to block the moisture in the ambient atmosphere from contacting the gas generating material. One means to block the moisture is a metal foil seal adhesively secured to a surface of the inflator housing across the discharge openings. The metal foil seal forms a moisture barrier between the gas generating material inside the inflator and the environment outside the inflator. When the inflator is actuated, the pressure of the gas flowing through the discharge openings ruptures the metal foil seal.

SUMMARY OF THE INVENTION

The present invention is an apparatus for inflating a vehicle occupant restraint, such as an air bag. The apparatus includes a housing having an axis and a housing wall extending transverse to the axis. Inflation fluid supply means in the housing, when actuated, supplies inflation fluid under pressure for inflating the occupant restraint. An actuator housing is located on the axis and has a chamber for an actuator for actuating the inflation fluid supply. A discharge opening located radially outward of the chamber in the actuator housing extends through the housing wall and enables inflation fluid to flow from the inflation fluid supply means and into the occupant restraint. An isolation member blocks fluid communication from the ambient environment around the housing through the discharge opening prior to actuation of the inflation fluid supply means. The isolation member comprises a ring-shaped metal member having a first portion welded to the housing wall and a second portion welded to the actuator housing. The metal member has a third portion breakable under the pressure of the inflation fluid from the actuated inflation fluid supply means acting on the third portion. When broken, the third portion is movable in response to the pressure of the inflation fluid to a position to enable inflation fluid to flow from the discharge opening past the metal member and into the occupant restraint.

In a preferred embodiment, the housing has inner and outer walls defining between them a diffuser chamber. The discharge opening extends through the housing inner wall between the inflation fluid supply means and the diffuser chamber for enabling inflation fluid to flow from the inflation fluid supply means and into the diffuser chamber. The isolation member extends across the diffuser chamber at a first location spaced away from the discharge opening.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 4 is a further enlarged fragmentary sectional view of a portion of the inflator assembly prior to actuation;

FIG. 7 is an elevational view of the isolation member.

DESCRIPTION OF THE PREFERRED EMBODIMENT

Figure 1:
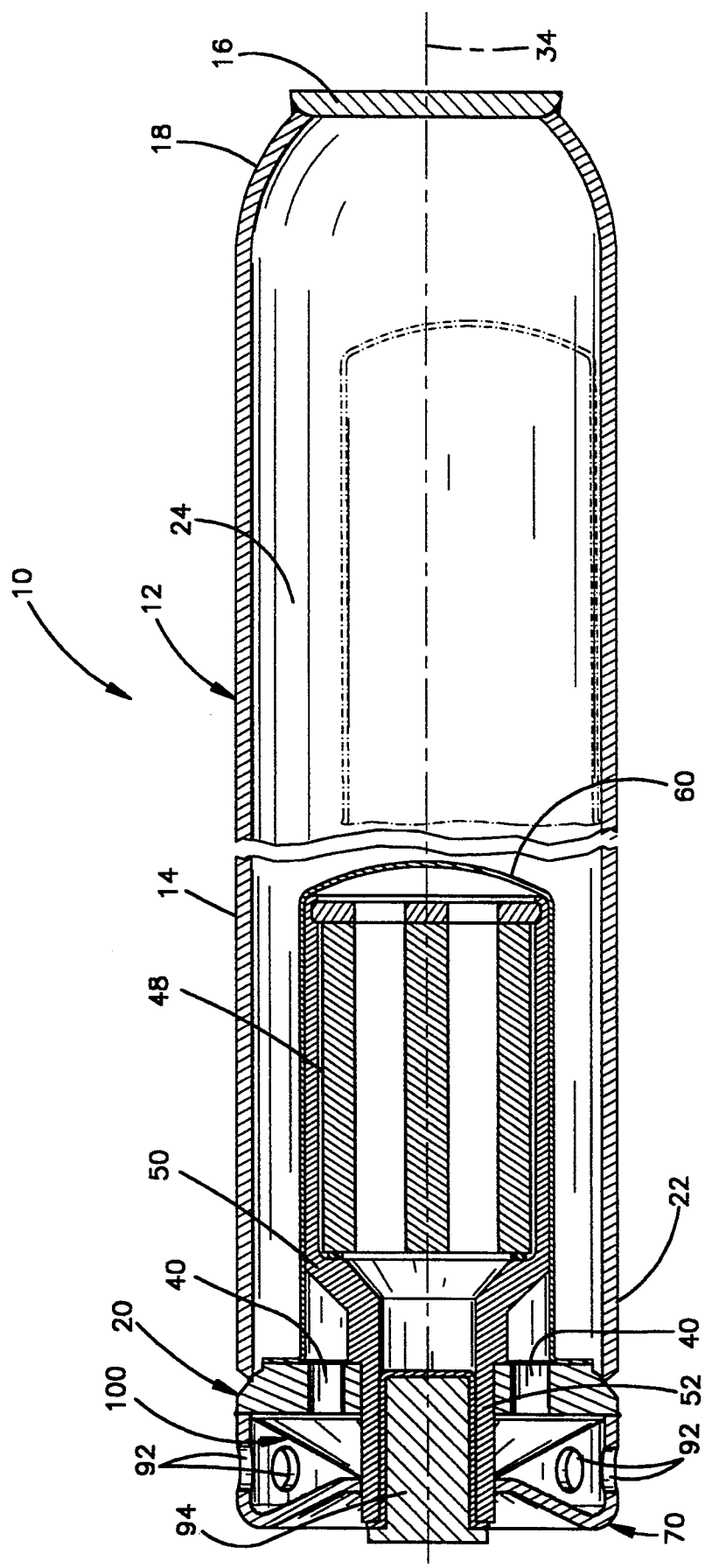
FIG. 1 is a sectional view of an inflator assembly constructed in accordance with the present invention.

The present invention relates to an air bag inflator and, particularly, to an inflator for inflating an air bag to protect an occupant of a vehicle. The present invention is applicable to various inflator constructions. As representative of the present invention, FIG. 1 illustrates an inflator 10.

The inflator 10 includes a housing 12. The housing 12 includes a cylindrical container 14 extending around a longitudinal central axis 34 of the inflator 10. An end cap 16 is attached by a circumferential weld to one end portion 18 of the container 14. An orifice plate 20 is attached by a circumferential weld to the opposite end portion 22 of the container 14.

The container 14, the end cap 16, and the orifice plate 20 together define a chamber 24 in the housing 12. The chamber 24 holds a supply of stored gas. The stored gas is preferably 95% argon and 5% helium. The gas is stored in the chamber 24 at a pressure of approximately 2,000 to 3,500 psi. Other gases could be stored in the chamber 24, and the gases could be stored at different pressures. For example, air or nitrogen or a mixture of gases could be stored in the chamber 24.

The orifice plate 20 (FIGS. 1 and 2) has an outer circumferential surface 30 and an inner circumferential surface 32. The orifice plate 20 has parallel inner and outer, radially-extending side surfaces 36 and 38. A plurality of circular discharge openings 40 are formed in the orifice plate 20 and extend axially between the inner and outer surfaces 36 and 38. The discharge openings 40 are arranged in a circular array about the central axis 34 of the inflator 10. Although only two discharge openings 40 are shown in FIG. 1, it should be understood that there are a greater number of discharge openings formed in the orifice plate 20.

A body of combustible gas generating material 48 (FIG. 1) is disposed inside an actuator housing 50 that is coaxial with the container 14. The gas generating material 48, together with the stored gas in the chamber 24, forms an inflation fluid supply means of the inflator 10. A tubular portion 52 (FIGS. 1 and 2) of the actuator housing 50 is secured to the orifice plate 20. An outer circumferential surface 54 of the actuator portion 52 is in abutting engagement with the inner circumferential surface 32 of the orifice plate 20.

A burst cup 60 is secured to the inner surface 36 of the orifice plate 20. The burst cup 60 is a cylindrical member which surrounds the actuator housing 50 and the gas generating material 48. The burst cup 60 has a frangible portion 62 adjacent the orifice plate 20.

A diffuser 70 is disposed at the left end (as viewed in FIG. 1) of the inflator 10. The diffuser 70 has a circumferential outer wall portion 72 extending axially from the orifice plate 20. The diffuser outer wall 72 has an outer circumferential surface 74 (FIG. 4) and an inner circumferential surface 76. An annular radially-extending surface 78 of the diffuser 70 extends between the outer and inner surfaces 74 and 76.

The diffuser 70 also has a conical wall portion 80 which extends radially and axially inward from the axially outer end of the diffuser outer wall portion 72. The diffuser conical wall portion 80 terminates in a radially-extending wall portion 82. The wall portion 82 has an annular radially inner surface 84 disposed adjacent to the circumferential outer surface 54 of the actuator housing portion 52.

The diffuser walls 72, 80 and 82, together with the actuator housing portion 52 and the orifice plate 20, define a diffuser chamber 90 in the inflator 10. The discharge openings 40 permit fluid flow from the interior of the burst cup 60 into the diffuser chamber 90. A plurality of radially-extending gas outlets 92 in the diffuser outer wall 72 permit fluid flow from the diffuser chamber 90 out of the inflator 10 and into the air bag (not shown). The gas outlets 92 are disposed in a circular array around the outer periphery of the diffuser 70.

An igniter 94 is secured inside a sleeve 95 that defines a chamber 96 in the tubular actuator housing portion 52. The igniter 94 may be any known igniter suitable to ignite the gas generating material 48. Between the igniter 94, the sleeve 95, and the actuator housing 50 there is a moisture-proof seal. This seal can be arrived at in a number of ways, including welding or crimping. This moisture-proof seal blocks propagation of moisture from the environment around the inflator 10 to the gas generating material 48 along a path between the igniter 94 and the housing 50.

The inflator 10 includes an isolation membrane 100 (FIGS. 1, 2, 4, and 7). The isolation membrane 100 is a ring-shaped member which extends symmetrically around the longitudinal central axis 34 of the inflator 10. The isolation membrane 100 is made of a thin, resilient, non-corroding material. Preferably, the isolation membrane 100 is made of stainless steel about 0.003 inches to 0.020 inches thick. The isolation membrane 100 could also be made of another metal or of plastic.

The isolation membrane 100 extends across the diffuser chamber 90 and is disposed between the discharge openings 40 and the gas outlets 92. The isolation member 100 divides the diffuser chamber 90 into an outer chamber 10 portion 146 and an inner chamber portion 148.

The radially innermost portion of the isolation membrane 100 is a tubular, axially-extending central flange 102 which defines a central opening 104 of the isolation membrane. The central flange 102 (FIG. 2) is disposed between the inner surface 84 of the diffuser wall portion 82 and the outer circumferential surface 54 of the actuator housing tubular portion 52. The diffuser wall portion 82, the isolation membrane flange 102, and the actuator housing portion 52 are welded together with a circumferential weld 106 extending around the actuator housing portion 52. The weld 106 provides a hermetic seal between the diffuser 70, the isolation membrane 100, and the actuator housing 50 at the location of the isolation membrane flange 102.

Figure 5:
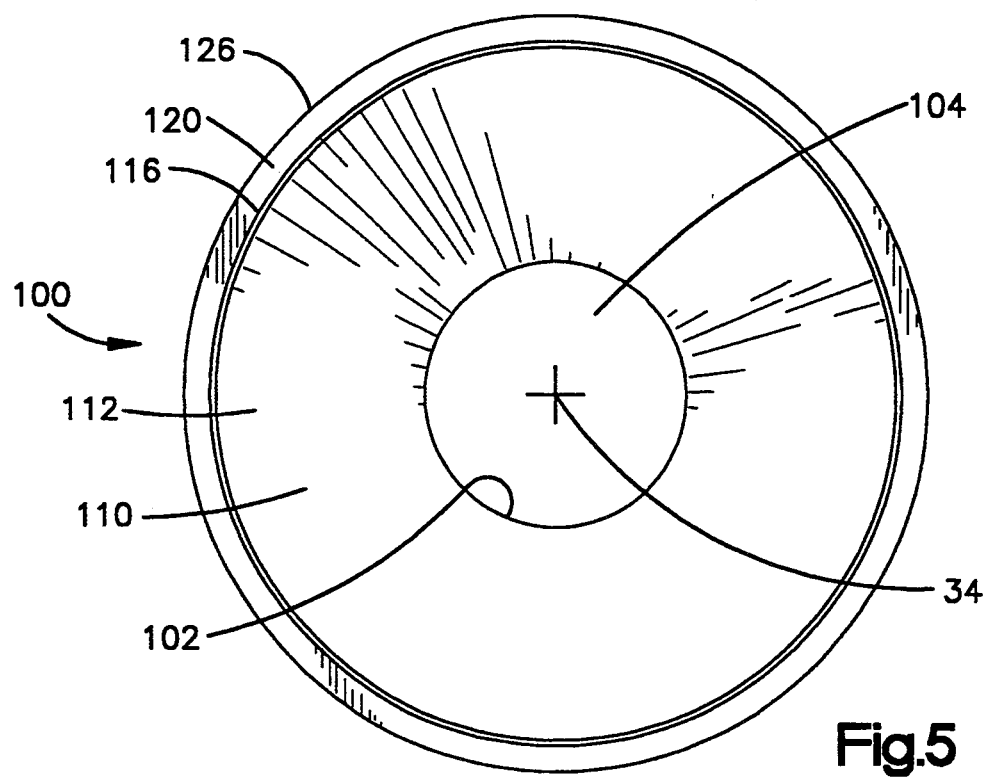
FIG. 5 is an axial end view of the isolation member.
Figure 6:
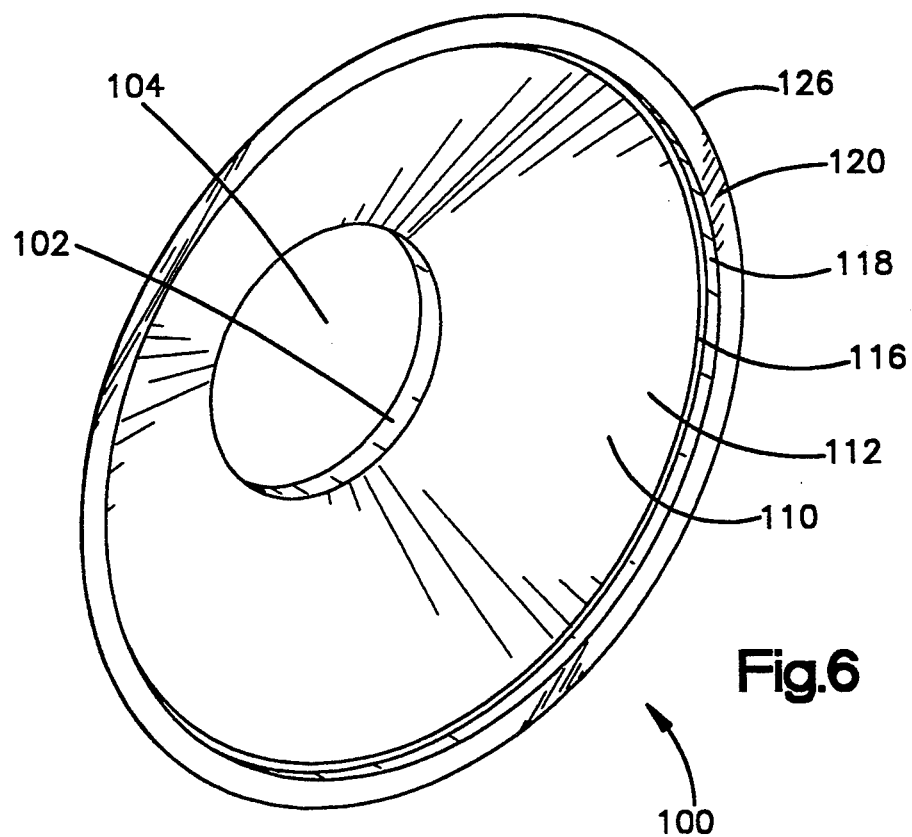
FIG. 6 is a perspective view of the isolation member.

A conical wall portion 110 of the isolation membrane 100 extends radially outward and axially inward (in a direction toward the chamber 24) from the central flange 102. The conical wall portion 110 extends between the junction of the diffuser 70 and the actuator housing 50, on the one hand, and the junction of the diffuser and the orifice plate 20, on the other hand. The conical wall portion 110 has an inner surface 112 presented toward the orifice plate 20. The conical wall portion 110 has an outer surface 114 presented toward the diffuser 70. The conical wall portion 110 gives the isolation membrane 100 a generally conical configuration and appearance, as can be seen in FIGS. 5 and 6.

Adjacent the junction of the diffuser 70 and the orifice plate 20, the isolation membrane 100 has an annular wall portion 116 which extends radially outward from the conical wall portion 110. Another annular wall portion 118 of the isolation membrane 100 extends axially inward (in a direction toward the chamber 24) from the radial wall portion 116. The axially extending wall portion 118 is in abutting engagement with the circumferential inner surface 76 of the outer wall 72 of the diffuser 70.

The isolation membrane 100 has an annular circumferential outer flange 120. The outer flange 120 extends radially outward from the axial wall portion 118. The flange 120 has parallel inner and outer, radially-extending side surfaces 122 and 124. The flange 120 is clamped axially between the diffuser 70 and the orifice plate 20. The inner surface 122 of the flange 120 is in abutting engagement with the axially outer surface 38 of the orifice plate 20. The outer surface 124 of the flange 120 is in abutting engagement with the axially inner surface 78 of the diffuser outer wall 72. An outer end portion 126 of the flange 120 projects radially outward from the outer surfaces 74 and 30 of the diffuser 70 and orifice plate 20, respectively.

The diffuser wall portion 72, the orifice plate 20, and the isolation membrane flange 120 are welded together with a circumferential weld 128 extending around the outer periphery of the inflator 10. The weld 128 provides a hermetic seal between the diffuser 70, the isolation membrane 100, and the orifice plate 20 at the location of the isolation membrane flange 120.

Most portions of the isolation membrane 100 have one uniform cross-sectional thickness. A stress riser 130 (FIGS. 2, 4 and 7), which is a portion of the isolation membrane 100 having a reduced cross-sectional thickness, is formed in the radial wall portion 116. The reduced cross-sectional thickness of the stress riser 130 results from the presence of an annular groove 132 having an arcuate cross-sectional configuration as viewed in a radial plane. The groove 132 and thus the stress riser 130 extend completely around the isolation membrane 100 coaxially with the central axis 34 of the inflator 10.

Figure 2:
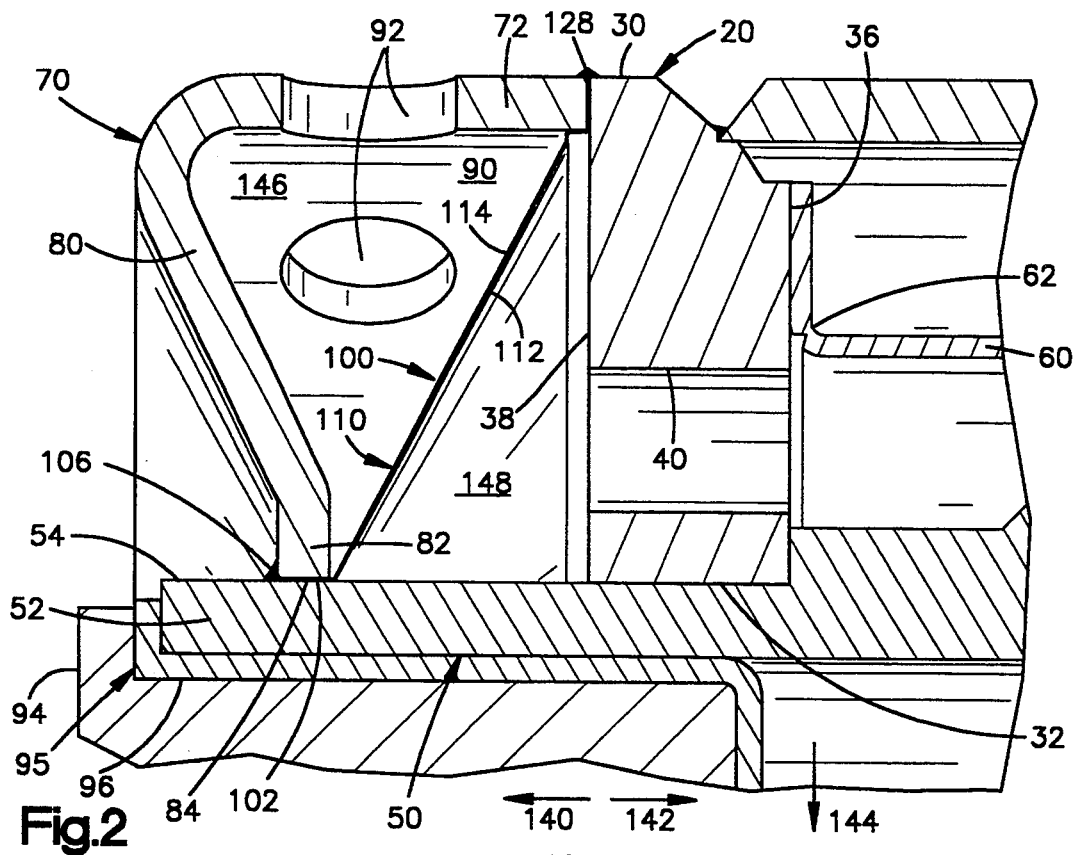
FIG. 2 is an enlarged fragmentary sectional view of a portion of the inflator assembly of FIG. 1 and showing a portion of an isolation member.

The inflator 10 is normally in the unactuated condition shown in FIGS. 1 and 2. The igniter 94 is not actuated, and the gas generating material 48 is not ignited. The burst cup 60 is disposed in the position shown in the solid lines in FIG. 1 with its frangible portion 62 unbroken. The gas outlets 92 are open into the outer chamber portion 146 and the discharge openings 40 are open into the inner chamber portion 148. The isolation membrane 100 blocks fluid flow across the diffuser chamber 100 between the discharge openings 40 and the gas outlets 92. The isolation membrane 100, thus, blocks fluid flow from the ambient environment around the inflator 10 through the discharge openings 40 into the interior of the inflator 10.

In the event of vehicle deceleration exceeding a predetermined deceleration, the igniter 94 is actuated in a known manner to ignite the gas generating material 48. Ignition of the gas generating material 48 creates gas which applies pressure against the closed end of the burst cup 60. The burst cup 60 breaks at its frangible portion 62 and moves to the position shown in dashed lines in FIG. 1. The stored gas in the chamber 24 is heated by the gas generating material 48 and flows out of the chamber 24 through the discharge openings 40. The gas flows through the discharge openings 40 into the diffuser chamber inner portion 148.

The flowing gas contacts the inner surface 112 of the conical wall portion 110 of the isolation membrane 100. The force exerted by the flowing gas upon the isolation membrane 100 stresses the isolation membrane in a direction away from the discharge openings 40. The stress riser 130 is the weakest portion of the isolation membrane 100. Therefore, when the force on the isolation membrane 100 from the flowing gas exceeds the rupture strength of the material at the stress riser 130, the isolation membrane breaks at a known location, i.e., the stress riser 130.

Figure 3:
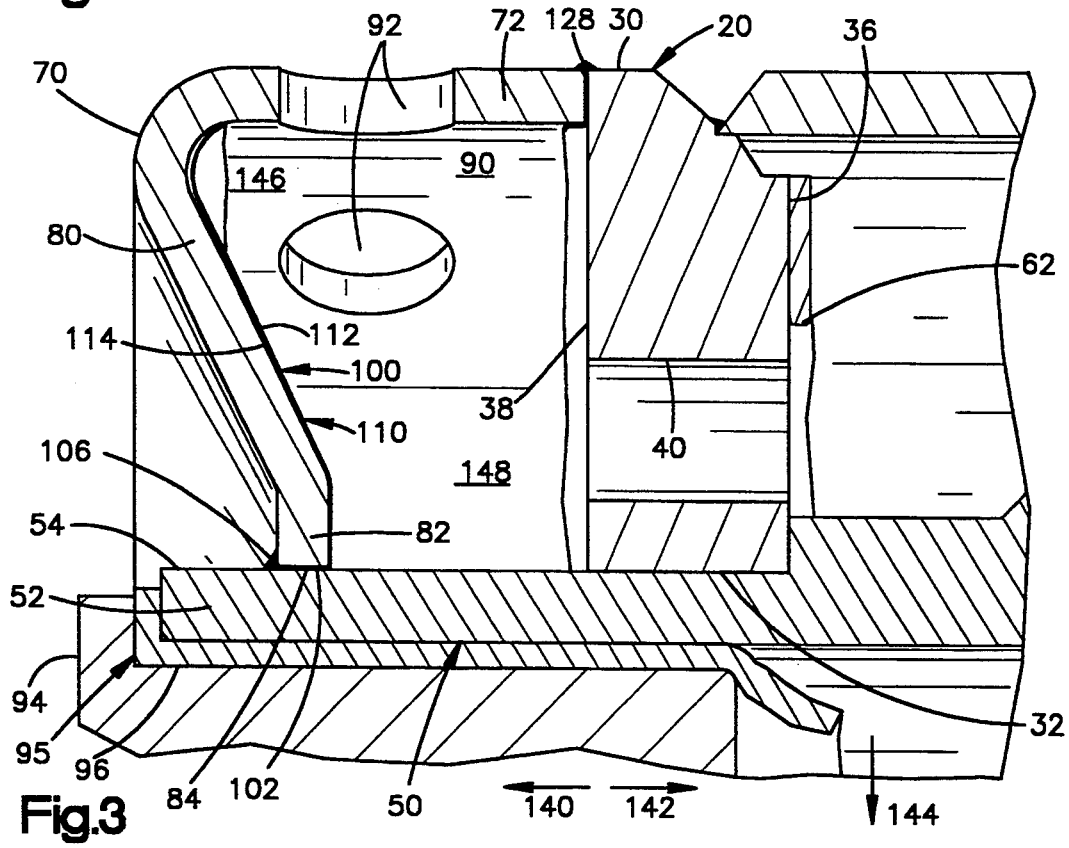
FIG. 3 is a view, similar to FIG. 1, illustrating the relationship between parts of the inflator assembly of FIG. 1 after the inflator assembly has been actuated.

The broken isolation membrane 100 moves to the position shown in FIG. 3. The conical wall portion 110 of the isolation membrane 100 overlies the inner surfaces of the diffuser walls 82 and 80. The isolation membrane wall portion 118 (FIG. 4) remains in its position adjacent the diffuser outer wall 72. The isolation membrane 100 is clear of both the discharge openings 40 and the gas outlets 92. Gas flowing from the chamber 24 can, thus, flow from the discharge openings 40 through the diffuser chamber 90 and through the gas outlets 92 to inflate the air bag. Because the isolation membrane 100 is thin, it is flexible enough to conform to the contour of the diffuser walls 82 and 80 and its presence in the diffuser chamber 90 does not affect fluid flow through the diffuser chamber 90.

Because the isolation membrane 100 is welded in place in the inflator 10, air or moisture cannot pass around the unbroken isolation membrane 100. Thus, the isolation membrane 10 forms a hermetic seal between the gas outlets 92 which are exposed to the environment around the inflator 10, and the discharge openings 40 which are exposed to the gas generating material and other parts inside the inflator 10. The welded connections of the isolation membrane 100 in the inflator 10 minimize any tendency for the isolation membrane to become disconnected from its mating parts, which tendency may be more likely with an adhesive connection.

The isolation membrane 100 is resilient and can flex in the event of pressure differentials across the membrane which may occur with temperature, air pressure, and altitude variations to which the inflator 10 is exposed. In the event of such pressure changes, the axially-extending wall portion 118 (FIG. 4) of the isolation membrane 100, which is not welded or otherwise secured to the diffuser outer wall 72, can pull away from the diffuser wall in a radially inward direction as indicated by the arrow 144. This resiliency of the isolation membrane 100 also reduces the tendency for degradation of the connections between the isolation membrane 100 and the housing 12.

From the above description of the invention, those skilled in the art will perceive improvements, changes, and modifications in the invention. Such improvements, changes, and modifications within the skill of the art are intended to be covered by the appended claims.

We claim:

1. An apparatus for inflating a vehicle occupant restraint, such as an air bag, said apparatus comprising:
a housing having an axis;
inflation fluid supply means in said housing for, when actuated, supplying inflation fluid for inflating the occupant restraint;
an actuator housing located on said axis and having a chamber;
an actuator means in said chamber for actuating said inflation fluid supply means;
at least one discharge opening spaced from said chamber and extending through said housing for enabling inflation fluid to flow into the occupant restraint; and
a ring-shaped isolation member encircling said actuator housing, said isolation member blocking said at least one discharge opening prior to actuation of said inflation fluid supply means;
said isolation member having a first portion secured to said housing and a second portion secured to said actuator housing, said isolation member having a third portion breakable under the pressure of the inflation fluid acting on said third portion, said third portion when broken being movable in response to the pressure of the inflation fluid to a position to enable inflation fluid to flow from said discharge opening past said isolation member and into the occupant restraint.

2. An apparatus as set forth in claim 1 wherein said first portion of said isolation member is welded to said housing at a first weld location and said second portion of said isolation member is welded to said actuator housing at a second weld location spaced axially and radially from said first weld location, said isolation member extending axially and radially between said first and second weld locations.

3. An apparatus as set forth in claim 1 wherein said first and second portions of said isolation member have a first cross-sectional thickness and said breakable portion of said isolation member has a cross-sectional thickness less than that of said first and second portions of said isolation member.

4. An apparatus as set forth in claim 1 wherein said isolation member has a generally circular configuration extending around said axis of said housing, said breakable third portion of said isolation member comprising an annular groove having a cross-sectional thickness less than the cross-sectional thickness of portions of said isolation member disposed on either side of said annular groove.

5. An apparatus as set forth in claim 1 wherein:

said housing comprises inner and outer walls partially defining between them a diffuser chamber;

said discharge opening extends through said housing inner wall for enabling inflation fluid to flow from said inflation fluid supply means and into said diffuser chamber;

said housing outer wall includes an outlet passage extending through said housing outer wall for enabling inflation fluid to flow from said diffuser chamber and into the vehicle occupant restraint; and said isolation member prior to actuation of said inflation fluid supply means extends across said diffuser chamber intermediate said discharge opening and said outlet passage and blocks fluid flow between said discharge opening and said outlet passage.

6. An apparatus as set forth in claim 5 wherein said housing inner and outer walls have facing surfaces and are welded together at a first weld location, said isolation member first portion being at least partially disposed between said facing surfaces of said housing inner and outer walls and being welded to said housing inner and outer walls.

7. An apparatus as set forth in claim 1 wherein said isolation member is conically shaped and extends around said axis of said housing, said isolation member first portion comprising a radially outer flange welded to said housing at a first weld location, said isolation member second portion comprising a radially inner flange welded to said actuator housing at a second weld location spaced radially inward and axially from said first weld location, said isolation member having a conical wall portion extending radially outward and axially between said inner flange portion and said outer flange, said isolation member third portion being disposed radially inward of said outer flange.

8. An apparatus as set forth in claim 1 wherein said inflation fluid supply means comprises gas generating material.

9. An apparatus for inflating a vehicle occupant restraint such as an air bag, said apparatus comprising:

a housing having inner and outer walls defining between them a diffuser chamber;

inflation fluid supply means in said housing for, when actuated, supplying inflation fluid under pressure for inflating the occupant restraint;

a discharge opening extending through said housing inner wall between said inflation fluid supply means and said diffuser chamber for enabling inflation fluid to flow from said inflation fluid supply means and into the diffuser chamber; and an isolation member for blocking fluid flow from the environment around said housing through said discharge opening prior to actuation of said inflation fluid supply means;

said isolation member comprising a membrane connected with said housing, said membrane having a wall portion extending across said diffuser chamber at a first position spaced away from said discharge opening and permitting fluid flow through said discharge opening into said diffuser chamber, said wall portion being breakable under the pressure of the inflation fluid acting on said wall portion, said wall portion when broken being movable in response to the pressure of the inflation fluid to a second position in said diffuser chamber to permit inflation fluid to flow from said diffuser chamber and into the occupant restraint.

10. An apparatus as set forth in claim 9 wherein said housing outer wall includes an outlet passage extending through said housing outer wall between said diffuser chamber and the environment around said housing for enabling inflation fluid to flow from said diffuser chamber and into the vehicle occupant restraint, said membrane when in the first position being disposed intermediate said discharge opening and said outlet passage and blocking fluid flow between said discharge opening and said outlet passage.

11. An apparatus as set forth in claim 9 wherein said membrane wall portion has a stress riser at which said membrane is breakable, all portions of said membrane other than said stress riser having the same cross-sectional thickness, said stress riser having a reduced cross-sectional thickness, whereby said membrane when sufficiently stressed breaks at said stress riser.

12. An apparatus set forth in claim 9 wherein said housing inner and outer walls have facing surfaces and are welded together at a first weld location, said membrane having a second wall portion at least partially disposed between said facing surfaces of said housing inner and outer walls and welded to said housing inner and outer walls at said first weld location.

13. An apparatus as set forth in claim 9 wherein said isolation member is conically shaped and extends around an axis of said housing, said isolation member having a radially outer flange welded to said housing at a first weld location, said isolation member having a radially inner flange welded to said housing at a second weld location spaced radially inward and axially from said first weld location, said isolation member wall portion extending radially outward and axially between said inner flange and said outer flange.

14. An apparatus for inflating a vehicle occupant restraint, such as an air bag, said apparatus comprising:

a housing having a housing wall;

inflation fluid supply means in said housing for, when actuated, supplying inflation fluid under pressure for inflating the occupant restraint;

a discharge opening extending through said housing wall for enabling inflation fluid to flow from said inflation fluid supply means and into the occupant restraint; and an isolation member for blocking fluid communication from the ambient environment around said housing through said discharge opening prior to actuation of said inflation fluid supply means;

said isolation member being hermetically sealed to said housing wall at first and second spaced seal locations, said isolation member having a stress riser formed at a predetermined location in said isolation member intermediate said first and second seal locations, said isolation member being breakable at said stress riser under the pressure of the inflation fluid flowing through said discharge opening to enable inflation fluid to flow from said discharge opening and into the occupant restraint.

15. An apparatus as set forth in claim 14 wherein said isolation member is a metal member welded to said housing wall at said first and second weld locations, said first and second seal locations comprising said first and second weld locations.

16. An apparatus as set forth in claim 15 wherein said housing wall comprises first and second parts having facing surfaces and being welded together at said first weld location, said isolation member having a portion at least partially disposed between said facing surfaces of said first and second housing wall parts and being welded to said first and second housing wall parts at said first weld location.

17. An apparatus as set forth in claim 14 wherein said first seal location is spaced apart axially and radially from said second seal location.

* * * * *